United States Patent
Lee

(10) Patent No.: US 10,625,430 B2
(45) Date of Patent: Apr. 21, 2020

(54) ROBOT GRIPPER

(71) Applicants: HYUNDAI MOTOR COMPANY, Seoul (KR); KIA MOTORS CORPORATION, Seoul (KR)

(72) Inventor: Yongcheol Lee, Yongin-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 16/191,756

(22) Filed: Nov. 15, 2018

(65) Prior Publication Data
US 2020/0016773 A1    Jan. 16, 2020

(30) Foreign Application Priority Data
Jul. 10, 2018  (KR) .................. 10-2018-0079843

(51) Int. Cl.
*B25J 15/08* (2006.01)
*B25J 9/16* (2006.01)

(52) U.S. Cl.
CPC ............. *B25J 15/08* (2013.01); *B25J 9/1612* (2013.01)

(58) Field of Classification Search
CPC .. B25J 15/0253; B25J 15/026; B25J 15/0266; B25J 15/0273; B25J 15/028; B25J 15/0293; B25J 15/106; B25J 15/08; B25J 9/1612; B66F 9/183
See application file for complete search history.

(56) References Cited

U.S. PATENT DOCUMENTS

| | | | | |
|---|---|---|---|---|
| 4,545,723 A * | 10/1985 | Clark | ....................... | B25J 15/04 294/86.4 |
| 4,819,978 A * | 4/1989 | Scheinman | ............ | B25J 13/082 294/119.1 |
| 5,360,249 A * | 11/1994 | Monforte | ............. | B25J 15/0475 294/119.1 |
| 8,408,618 B2 * | 4/2013 | Unmuth | ................. | B25J 15/106 294/99.1 |
| 8,622,452 B2 * | 1/2014 | Yamaguchi | .......... | B25J 15/0028 294/106 |
| 8,939,487 B2 * | 1/2015 | De Koning | .............. | B25J 15/02 294/119.1 |

OTHER PUBLICATIONS

Home Depot.com—Grip-Rite 10 × 3 Screw , Jun. 2013.*

* cited by examiner

*Primary Examiner* — Stephen A Vu
(74) *Attorney, Agent, or Firm* — Brinks Gilson & Lione

(57) ABSTRACT

A robot gripper includes: i) a gripper body mounted at a front end of an arm of a robot, ii) a pair of mounting brackets installed on respective sides of the gripper body and configured to reciprocate in a direction toward each other or in a direction away from each other, and iii) finger members facing each other and fixedly installed on the pair of mounting brackets. In particular, the finger members include gripping recesses to grip portions of the screw part having different sizes and formed on ends of the screw part.

14 Claims, 16 Drawing Sheets

ROBOT GRIPPER

CROSS-REFERENCE TO RELATED APPLICATION

This application claims priority to and the benefit of Korean Patent Application No. 10-2018-0079843, filed on Jul. 10, 2018, the entire contents of which are incorporated herein by reference.

FIELD

The present disclosure relates to a robot gripper.

BACKGROUND

The statements in this section merely provide background information related to the present disclosure and may not constitute prior art.

In general, a screw part including a bolt and a nut is a typical mechanical element for coupling two or more parts. The screw parts are used in various mechanical industrial fields including an automobile manufacturing field.

In particular, most of the work done in an assembly process of a completed vehicle production process in the automobile manufacturing field is engaging various parts to vehicle bodies using screw parts such as a bolt and a nut.

Furthermore, in a vehicle inspection line of the completed vehicle production process, wheel alignment of vehicles is inspected and adjusted. In such a wheel alignment process, an operator properly aligns tires by adjusting a toe, a camber, and a caster using a spanner and torque wrench.

For example, in the wheel alignment process, a stop nut of a tie rod assembly is loosened, an adjustment bolt is rotated to adjust a toe of the wheels, and the stop nut is subsequently tightened again to maintain the adjusted state of the toe.

In recent years, an operation of tightening or loosening screw parts such as a bolt and a nut has been performed using a robot in the wheel alignment process as described above. In order to perform a running operation of the screw parts using the robot, a robot gripper equipped with a gripper tool such as an electric bolt/nut runner is used at a front end of an arm of the robot in the related art.

However, in the related art, since gripper tools suitable for screw parts of various standards (e.g., sizes) are replaced to be used, a running operation time of the screw parts is increased due to a tool replacement time.

In addition, in the related art, we have discovered that when a running operation of the screw part is performed through a behavior of a robot in a state in which both sides of the screw part are gripped by a gripper tool having a planar group surface, the gripper tool is required to have higher holding power and torque as tightening torque of the screw part is increased, disadvantageously increasing the size and weight of the gripper tool.

The above information disclosed in this Background section is only for enhancement of understanding of the background of the present disclosure and therefore it may contain information that does not form the prior art that is already known in this country to a person of ordinary skill in the art.

SUMMARY

The present disclosure provides a robot gripper having advantages of performing a running operation (operation of tightening or loosening a bolt and a nut) of screw parts having various screw standards (e.g., sizes) using a single tool.

An exemplary form of the present disclosure provides a robot gripper including: i) a gripper body mounted at a front end of an arm of a robot; ii) a pair of mounting brackets installed on respective sides of the gripper body and configured to reciprocate in a direction toward each other or in a direction away from each other; and iii) at least two finger members facing each other and fixedly installed on the pair of mounting brackets. In particular, the at least two finger members each include gripping recesses configured to receive a screw part having different sizes.

In the robot gripper according to an exemplary form of the present disclosure, the pair of mounting brackets may be installed to reciprocate through an operating cylinder in the gripper body.

In the robot gripper according to an exemplary form of the present disclosure, the gripping recesses have a size that are gradually increased or decreased from one side toward another side to correspond to the different sizes of the screw part.

In an exemplary form of the present disclosure, a first finger member of the at least two finger member mounted on a first mounting bracket of the pair of mounting brackets may grip one side portion of a center of the screw part through the gripping recesses of the first finger member.

In another form, a second finger member of the at least two finger members mounted on a second mounting bracket of the pair of mounting brackets may grip the other side portion of the center of the screw part through the gripping recesses of the second finger member.

In an exemplary form of the present disclosure, the gripping recesses of the at least two finger members may include a plurality of support surfaces supporting an edge of the screw part having a polygonal shape and a plurality of support recesses supporting a corner of the screw part.

In the robot gripper according to an exemplary form of the present disclosure, the at least two finger members may be provided as plate types arranged in a direction perpendicular to a movement direction of each of the pair of mounting brackets, and may be engaged to each of the pair of mounting brackets through a fixing bolt.

Another exemplary form of the present disclosure provides a robot gripper including: i) a gripper body mounted at a front end of an arm of a robot; ii) a pair of mounting brackets installed on respective sides of the gripper body and configured to reciprocate in a direction toward each other or in a direction away from each other; and iii) at least two finger members facing each other and fixedly installed on the pair of mounting brackets. In particular, the at least two finger members each include gripping recesses configured to receive a screw part having different sizes, and the gripping recesses of the at least two finger members may be formed such that the center of the screw part is offset by a predetermined interval from ends of the at least two finger members.

In an exemplary form of the present disclosure, when the at least two finger members grip the screw part, an offset interval may be formed between the facing ends of the at least two finger members and the center of the screw part.

In the robot gripper according to an exemplary form of the present disclosure, when the at least two finger members grip the screw part, a predetermined gap may be formed between the facing ends of the at least two finger members due to the offset interval.

In another form, the screw part to which the robot gripper is applied may include a bolt fastened to a screw assembly portion and a nut fastened to a screw shaft of the bolt, and the bolt and the nut may be provided to have different sizes.

In another form, the at least two finger members may grip the nut having a relatively large size through the gripping recesses, and the bolt having a relatively small size by positioning a circumscribed circle of bolt in an inner region of the gripping recesses.

In an exemplary form of the present disclosure, when the gripping recesses receive the screw part having a relatively small size, the offset interval is configured to position the gripping recesses outside of a circumscribed circle of the screw part having a relatively small size.

Yet another exemplary form of the present disclosure provides a robot gripper for tightening or loosening a screw part including: a bolt fastened to a screw assembly portion and a nut fastened to a screw shaft of the bolt. In particular, the robot gripper includes: a gripper body mounted at a front end of an arm of a robot; first and second mounting brackets installed on respective sides of the gripper body and configured to reciprocate in a direction toward each other or in a direction away from each other; a pair of first finger members facing each other and fixedly installed on the first and second mounting brackets, respectively, where the pair of first finger members include first gripping recesses configured to receive the nut; and a pair of second finger members facing each other and fixedly installed on the first and second mounting brackets, respectively, where the pair of second finger members include second gripping recesses configured to receive the bolt having a smaller size than the nut.

In one an exemplary form of the present disclosure, the first gripping recesses may be formed such that the center of the nut is offset at a predetermined interval from the ends of the first finger members.

In the robot gripper according to an exemplary form of the present disclosure, when the first finger members grip the nut, an offset interval may be formed between the facing ends of the pair of first finger members and the center of the nut, and a predetermined gap may be formed between the facing ends due to the offset interval.

In the robot gripper according to an exemplary form of the present disclosure, the second finger members may allow a circumscribed circle of the bolt to be positioned at an inner region of the second gripping recess due to the offset interval.

In the robot gripper according to an exemplary form of the present disclosure, the first and second gripping recesses may have a plurality of support surfaces respectively supporting edges of the screw part having a polygonal shape and a plurality of supporting recesses supporting corners of the screw part.

The robot gripper according to an exemplary form of the present disclosure may adjust wheel alignment of wheels of a vehicle by tightening or loosening a bolt fastened to a tie rod assembly and a nut having a greater size than the bolt, and the nut is fastened to a screw shaft of the bolt through the first and second finger members.

According to the exemplary forms of the present disclosure, a tool fitting a size of a screw part does not need to be replaced each time as in the related art, thereby shortening time for a running operation of the screw part.

Other effects that can be obtained or expected from the forms of the present disclosure will be explicitly or implicitly disclosed by the detailed description of the forms of the present disclosure. That is, various effects expected from the forms of the present disclosure will be disclosed in the following description.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
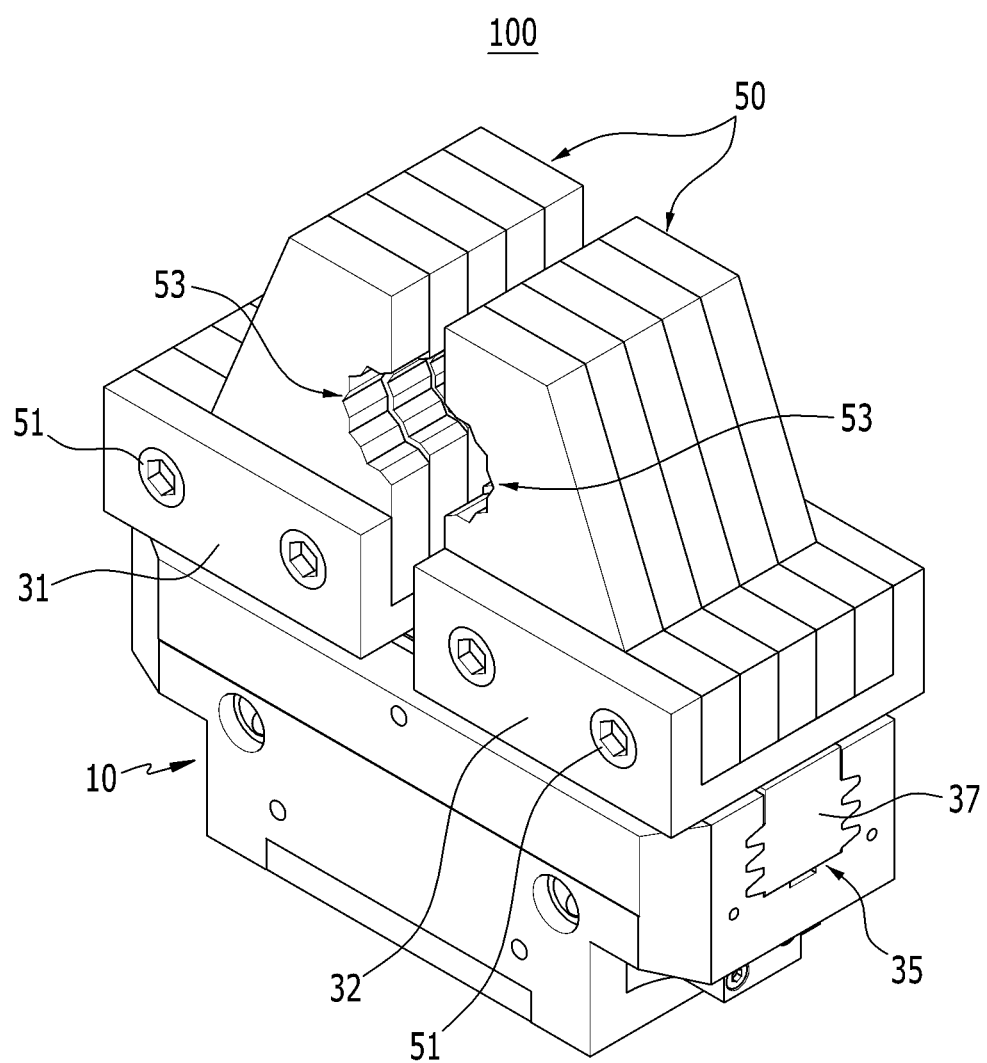
FIG. 1 is an assembled perspective view illustrating a robot gripper according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As those skilled in the art would realize, the described exemplary forms may be modified in various different ways, all without departing from the spirit or scope of the present disclosure.

In order to clarify the present disclosure, parts that are irrelevant to the description will be omitted, and similar reference numerals are used for the similar parts throughout the specification.

The size and thickness of each element are arbitrarily shown in the drawings, and the present disclosure is not necessarily limited thereto. In the drawings, the thickness of layers, films, panels, regions, etc., are exaggerated for clarity.

In the following descriptions, terms such as "first", "second", etc. may be used only to distinguish one component from another as pertinent components are named the same, and an order thereof is not limited.

Throughout the specification, unless explicitly described to the contrary, the word "comprise" and variations such as "comprises" or "comprising" will be understood to imply the inclusion of stated elements but not the exclusion of any other elements.

The terms "unit", "means", "part", "member", and the like, described in the specification, refer to units of comprehensive configuration performing at least one function or operation.

Figure 2:
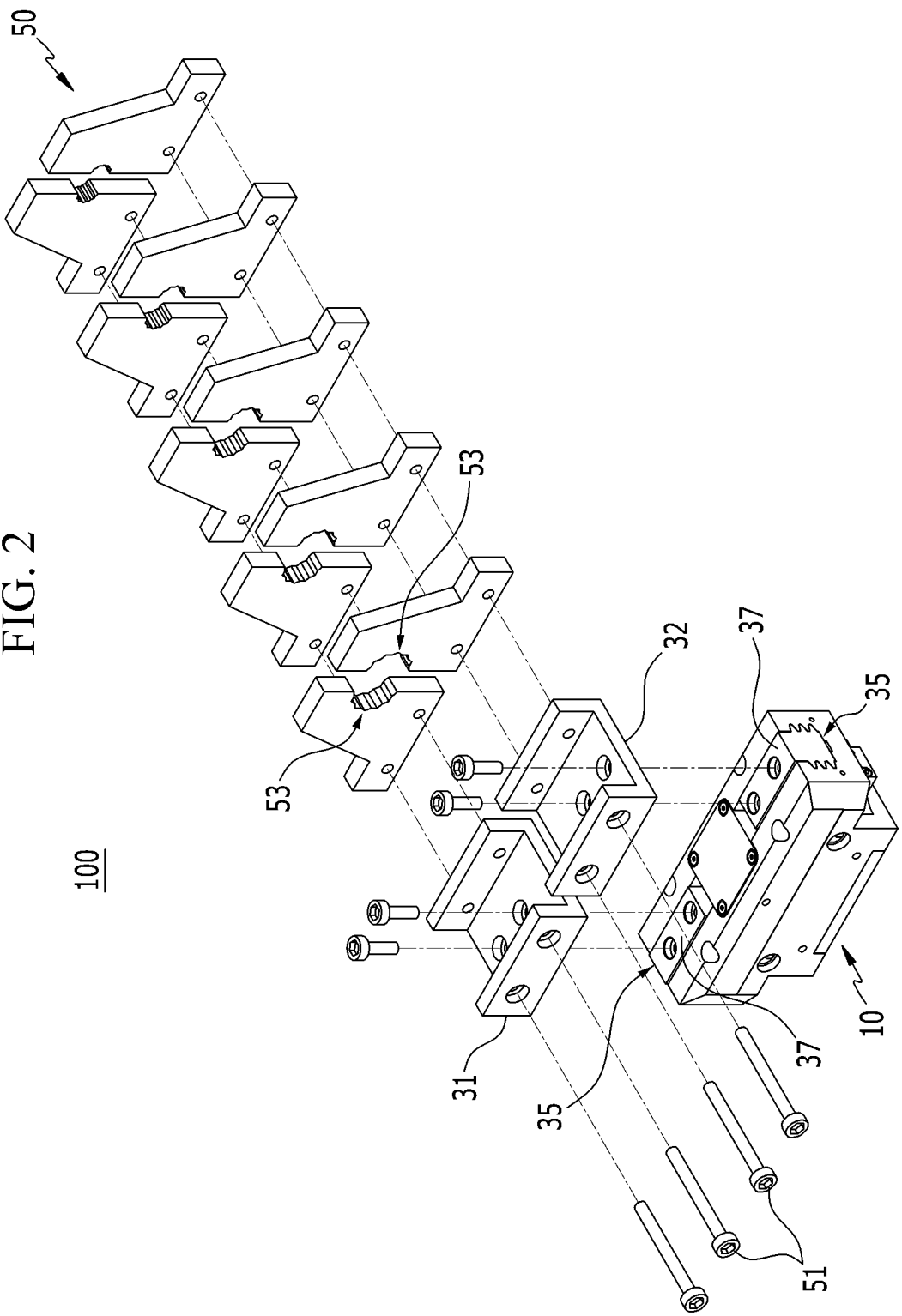
FIG. 2 is an exploded perspective view illustrating a robot gripper according to an exemplary form of the present disclosure.
Figure 3:
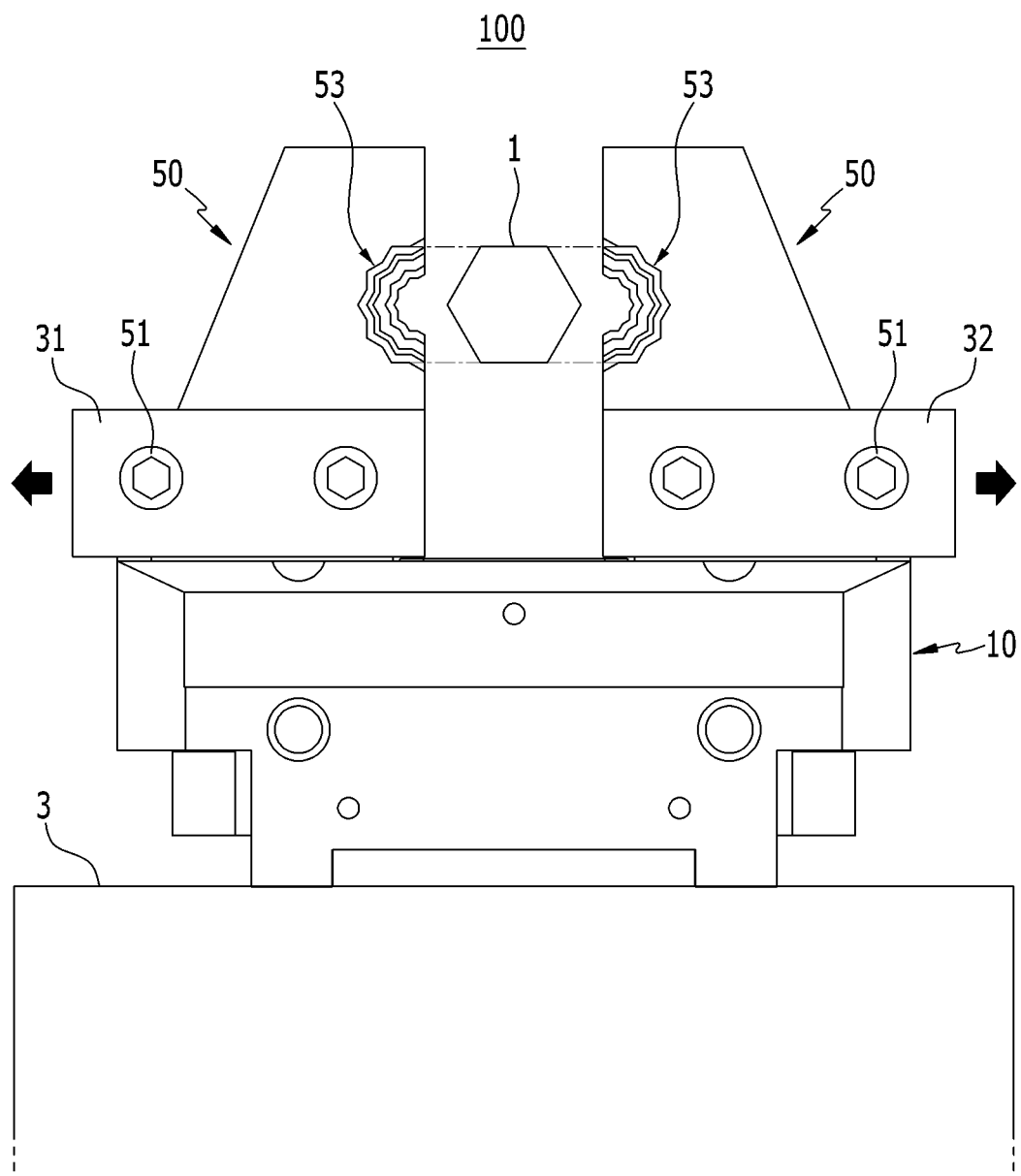
FIG. 3 is a front view of a coupled configuration of a robot gripper and illustrating a pair of mounting brackets moving away from each other according to an exemplary form of the present disclosure.
Figure 4:
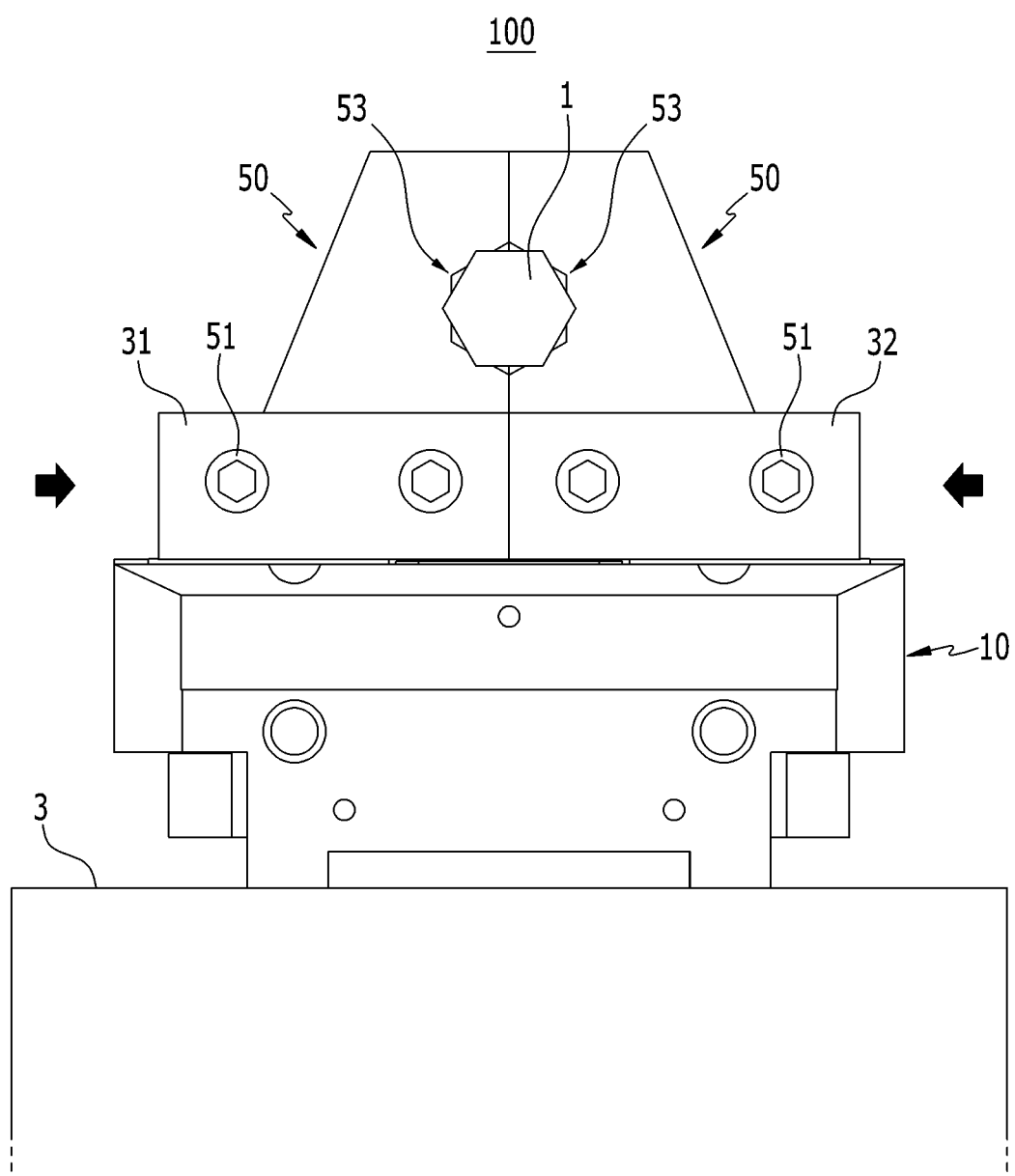
FIG. 4 is a front view of a coupled configuration of the robot gripper in FIG. 3 and illustrating the pair of mounting brackets moving toward each other.
Figure 5:
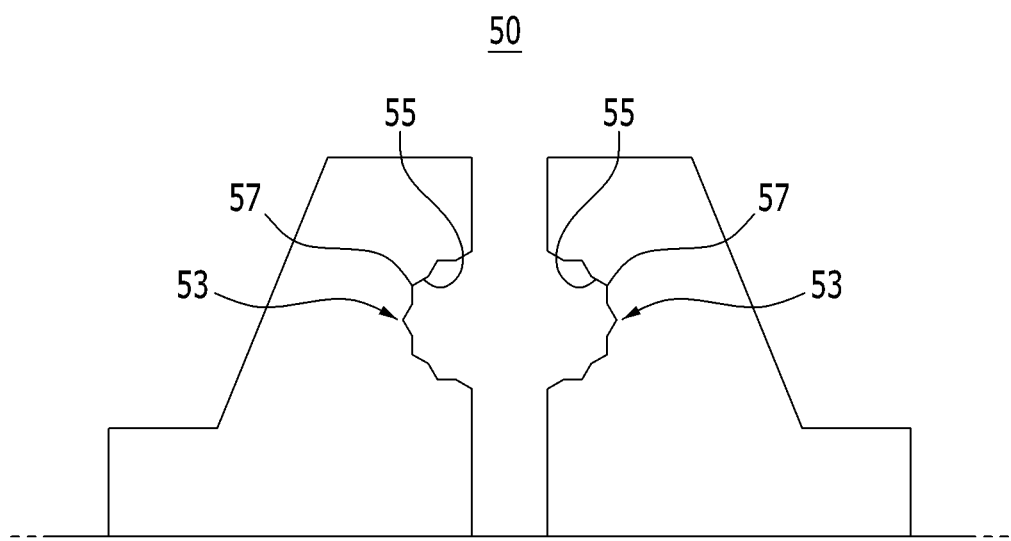
FIG. 5 is a view illustrating a gripping recess of a finger member applied to a robot gripper according to an exemplary form of the present disclosure.

FIG. 1 is an assembled perspective view illustrating a robot gripper according to an exemplary form of the present disclosure, FIG. 2 is an exploded perspective view of the robot gripper of FIG. 1, and FIGS. 3 and 4 are front views of the robot gripper of FIG. 1.

Referring to FIGS. 1 to 4, a robot gripper 100 according to an exemplary form of the present disclosure may be applied to a vehicle assembly line for assembling various parts to a vehicle body during a vehicle assembly process or a vehicle inspection line of a complete vehicle production process.

For example, the robot gripper 100 serves to perform a running operation to tighten or loosen a screw part 1, e.g., a bolt or a nut having a polygonal shape (quadrangular or hexagonal shape), fastened to a vehicle body and various vehicle parts by the behavior of a robot 3.

However, it should be appreciated that coverage of the present disclosure is not limited to performing the running operation of the screw part 1 fastened to a vehicle body and various vehicle parts, and the technical concept of the present disclosure may be applied to any running operation of a screw part fastened to various structures.

In general, in a vehicle assembly process, a transfer direction of a vehicle body is a T direction, a vehicle width direction is an L direction, and a height direction of a vehicle body is an H direction. However, in an exemplary form of the present disclosure, the following components will be described on the basis of a case where the robot gripper 100 is erected in a vertical direction and viewed, rather than on the basis of the LTH directions mentioned above.

Hereinafter, with respect to forward/backward and leftward/rightward directions, a part facing upwards will be referred to as an upper end portion, an upper portion, an upper end, and an upper surface, and a part facing downwards will be referred to as a lower end portion, a lower portion, a lower end, and a lower surface.

However, the definition of the directions mentioned above has a relative meaning and the directions may be varied according to an engagement position of the screw part 1, a reference position of the robot gripper 100, and the like, and thus the foregoing reference direction is not limited to the reference direction of the present exemplary form.

In addition, hereinafter, an "end (one end or the other end)" may be defined as any one end or may be defined as a predetermined portion (one end portion or the other end portion) including the end.

The robot gripper 100 according to an exemplary form of the present disclosure has a structure for performing a running operation of the screw part 1 having various screw sizes using a single tool.

To this end, as illustrated in FIG. 1, the robot gripper 100 basically includes a gripper body 10, a pair of mounting brackets 31 and 32, and finger members 50.

In an exemplary form of the present disclosure, the gripper body 10 is provided as a frame mounted at a front end of an arm of the robot 3 in FIG. 3. The gripper body 10 may be fixed to the front end side of the arm of the robot 3, or separated from the front end of the arm of the robot 3 through a tool changer (not shown) provided on the front end side of the arm of the robot 3.

The gripper body 10, serving to mount various components to be described hereinafter, may be provided as a single frame or two or more divided and mutually coupled frames.

The gripper body 10 may have adjunctive components such as various brackets, a support block, a plate, a housing, a cover, a collar, and the like. The adjunctive components serve to install various components to be described hereinafter in the gripper body 10, and the adjunctive components will be referred to as the gripper body 10, except for an exceptional case.

Here, the robot 3 described above is provided as a handling robot that is known in the art. The robot 3 may be provided as an articulated robot operating according to a teaching path set by a robot controller (not shown).

In one form, the pair of mounting brackets 31 and 32 are disposed in left and right directions on an upper surface of the gripper body 10. The pair of mounting brackets 31 and 32 are installed to reciprocate in a direction toward each other as illustrated in FIG. 4, or in a direction away from each other (see FIG. 3) on left and right sides of the gripper body 10.

Hereinafter, the mounting bracket disposed on one side of the gripper body 10 will be referred to as a first mounting bracket 31 and the mounting bracket disposed on the other side of the gripper body 10 will be referred to as a second mounting bracket 32.

The first and second mounting brackets 31 and 32 described above are installed to reciprocate in a horizontal direction through a known operating cylinder 35 on an upper surface of the gripper body 10. The operating cylinder 35, which generates a forward/backward movement operating by pneumatic pressure or oil pressure, includes forward/backward operating portions 37.

Here, the forward/backward operating portions 37 are disposed on left and right sides with respect to the center of an upper surface of the gripper body 10, respectively, and are coupled to the first and second mounting brackets 31 and 32 through a fastening unit such as a bolt.

In an exemplary form of the present disclosure, the finger members 50 grip screw parts 1 having different screw sizes, respectively, and are fixed and installed on each of the first and second mounting brackets 31 and 32.

The finger members 50 are provided as plate types arranged in a direction perpendicular to a movement direction of the first and second mounting brackets 31 and 32, i.e., in a forward/backward direction. The finger members 50 are fastened to the first and second mounting brackets 31 and 32 through fixing bolts 51 in the forward/backward direction.

The finger members 50, as a pair facing each other in a left/right direction, may grip the screw part 1 as the first and second mounting brackets 31 and 32 move in a direction toward each other by the operating cylinder 35. The finger members 50 may release gripping of the screw part 1 as the first and second mounting brackets 31 and 32 move in a direction away from each other by the operating cylinder 35.

The pair of finger members 50 include gripping recesses 53 formed in facing ends of the finger members, and the gripping recesses are formed to receive the screw parts 1 that may include portions having different sizes.

That is, the finger members 50 mounted on the first mounting bracket 31 may grip one portion of the center of the screw part 1 through the gripping recess 53 and the finger members 50 mounted on the second mounting bracket 32 may grip the other portion of the center of the screw part 1 through the gripping recess 53.

Here, the finger members 50 form the griping recess 53 having a size that is gradually increased or decreased from one side toward the other side along the forward/backward direction to correspond to different sizes of the screw part 1.

Also, the gripping recess 53 of the finger members 50 includes a plurality of support surfaces 55 supporting an edge of the screw part 1 having a polygonal shape and a plurality of support recesses 57 formed on the support surfaces 55 and supporting a corner of the screw part 1.

Hereinafter, an operation of the robot gripper 100 according to an exemplary form of the present disclosure will be described in detail with reference to the accompanying drawings.

First, a front end of an arm of the robot 3 is moved to the screw part 1 side, and here, the first and second mounting brackets 31 and 32 are in a state of having been moved in a direction away from each other together with the finger members 50 by the operating cylinder 35.

In this state, the screw part 1 is positioned between the finger members 50 facing each other by the first and second mounting brackets 31 and 32. Thereafter, the first and second mounting brackets 31 and 32 are moved, together with the finger members 50, in a direction toward each other by driving the operating cylinder 35.

Then, as the finger members 50 of the first and second mounting brackets 31 and 32 are moved in a direction toward each other in a facing manner according to the movement of the first and second mounting brackets 31 and 32, the screw part 1 may be gripped through the pair of finger members 50 forming the gripping recess 53 fitting a screw size of the screw part 1.

That is, the pair of finger members 50 facing each other in the left/right direction and forming the gripping recess 53 fitting the screw size of the screw part 1 grip one side portion and the other side portion of the screw part 1 through the gripping recess 53.

Here, the gripping recess 53 of the finger members 50 may support edges of the screw part through the support surfaces 55 and support edges of the screw part 1 through the support recesses 57 to grip the one side portion and the other side portion of the center of the screw part 1.

Next, in an exemplary form of the present disclosure, in a state of gripping the screw part 1 through the finger member 50, a running operation of tightening or loosening the screw part 1 is performed, while rotating the gripper body 10 in one direction or in the other direction by the behavior of the robot 3.

In a state in which the running operation of the screw part 1 is completed, when the first and second mounting brackets 31 and 32 are moved, together with the finger members 50, in a direction away from each other by driving the operating cylinder 35, gripping of the screw part 1 by the finger members 50 may be released in an exemplary form of the present disclosure.

According to the robot gripper 100 described above, the running operation of tightening or loosening the screw part 1 having different screw sizes may be performed by a single tool mounted on the arm of the robot 3.

Thus, in an exemplary form of the present disclosure, there is no need to replace the tool fitting the size of the screw part 1 as in the related art, and thus, time for performing the running operation of the screw part 1 may be shortened.

Also, in an exemplary form of the present disclosure, since the support surfaces 55 and the support recesses 57 are formed on the gripping recess 53 of the finger members 50 gripping the screw part 1, the running operation of the screw part 1 may be performed with less holding power and low torque, reducing the overall size and weight of the gripper tool.

Figure 6A:
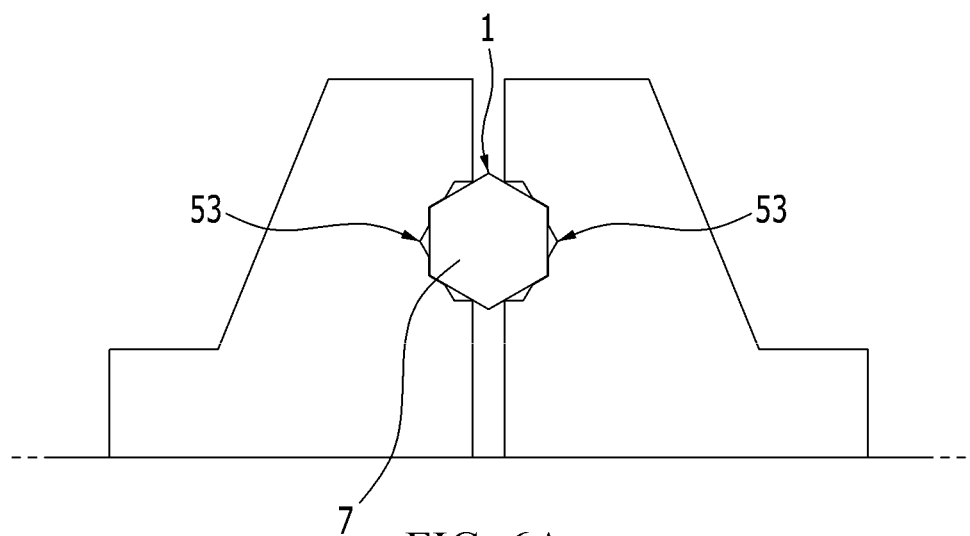
FIGS. 6A and 6B are views illustrating a modification of a finger member applied to a robot gripper according to the exemplary form of the present disclosure.
Figure 6B:
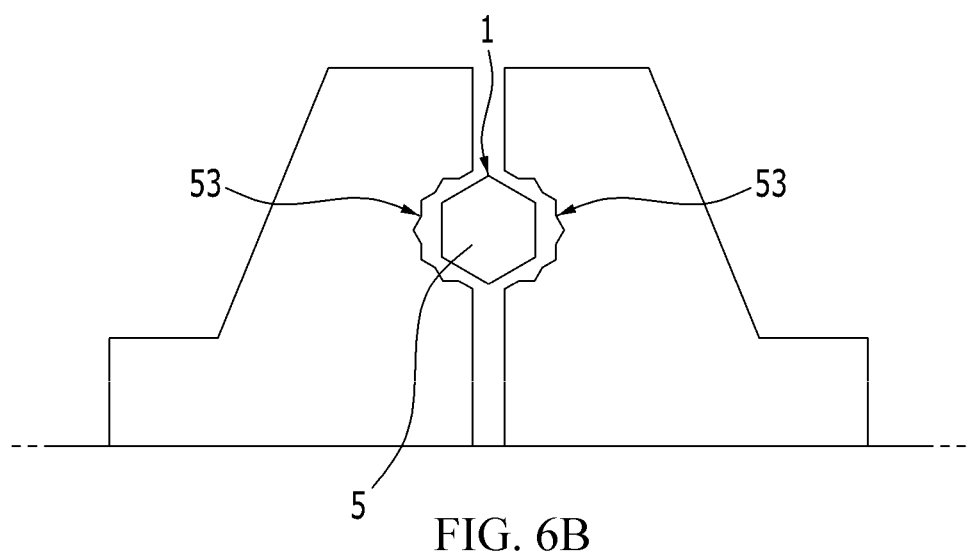

FIGS. 6A and 6B illustrate a modification of a finger member applied to a robot gripper according to an exemplary form of the present disclosure.

Referring to FIGS. 6A and 6B, the modification of the finger members 50 according to an exemplary form of the present disclosure may include the gripping recess 53 formed such that the center of the screw part 1 is offset at a predetermined interval from the ends of the finger members 50, with respect to the pair of facing finger members 50. In this modification, the other configuration of the gripping recess 53 is the same as that of the above description, and thus a detailed description thereof will be omitted.

Figure 7:
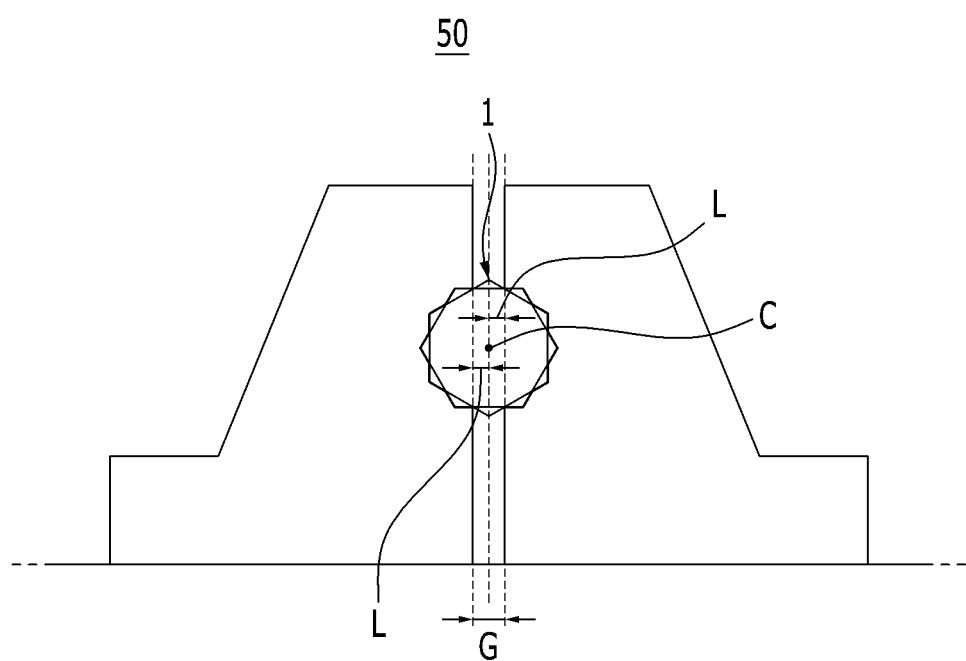
FIG. 7 is a view illustrating an offset providing structure in a modification of a finger member applied to the robot gripper according to the exemplary form of the present disclosure.

In this modification, as illustrated in FIG. 7, when the finger members 50 grip the screw part 1, an offset interval L is formed between the facing ends of the finger members 50 and the center C of the screw part 1. Accordingly, when the finger members 50 grip the screw part 1, a predetermined gap G is formed between the facing ends of the finger members 50 due to the offset interval L.

For example, the screw part 1 may include a polygonal bolt 5 (see FIG. 6B) fastened to a screw assembly part (not shown), and a polygonal nut 7 (see FIG. 6A) fastened to a screw shaft of the bolt 5. Further, the bolt 5 having a smaller size than that of the nut 7 may be provided.

In this case, the finger members 50 may grip the nut 7 having a relatively large size through the gripping recess 53, and the bolt 5 having a relatively small size by positioning a circumscribed circle of the bolt 5 in an inner region of the gripping recess 53. That is, the gripping recess 53 corresponding to the bolt 5 having a relatively small size may be positioned outside the circumscribed circle of the bolt 5 due to the offset interval L.

Figure 8:
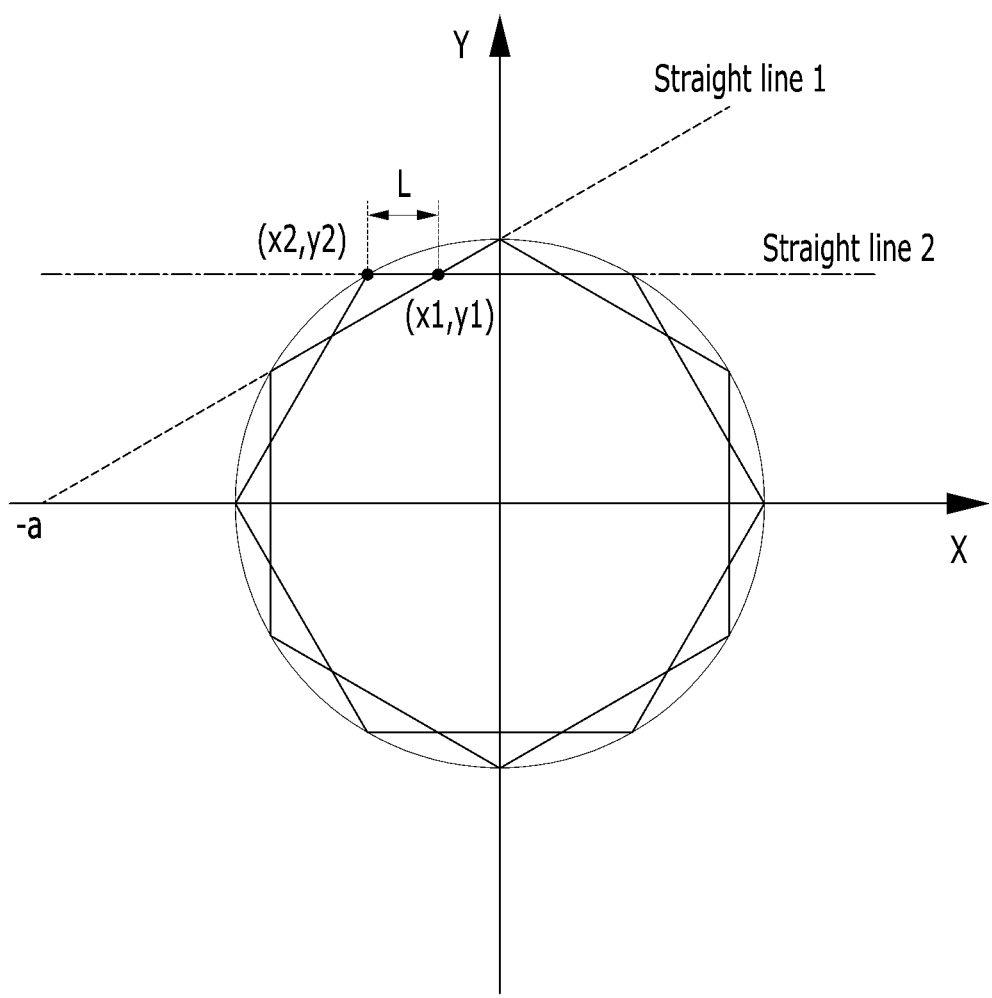
FIGS. 8 to 13 are diagrams illustrating a process of calculating an offset interval based on various equations in a modification of the finger member applied to a robot gripper according to the exemplary form of the present disclosure.

As illustrated in FIG. 8, the offset interval L may be set by obtaining coordinates of (x1, y1) and (x2, y2) where a straight line 1 and a straight line 2 meet with respect to a screw part having a certain size, and calculating an interval between (x1, y1) and (x2, y2) in an X direction.

Figure 9:
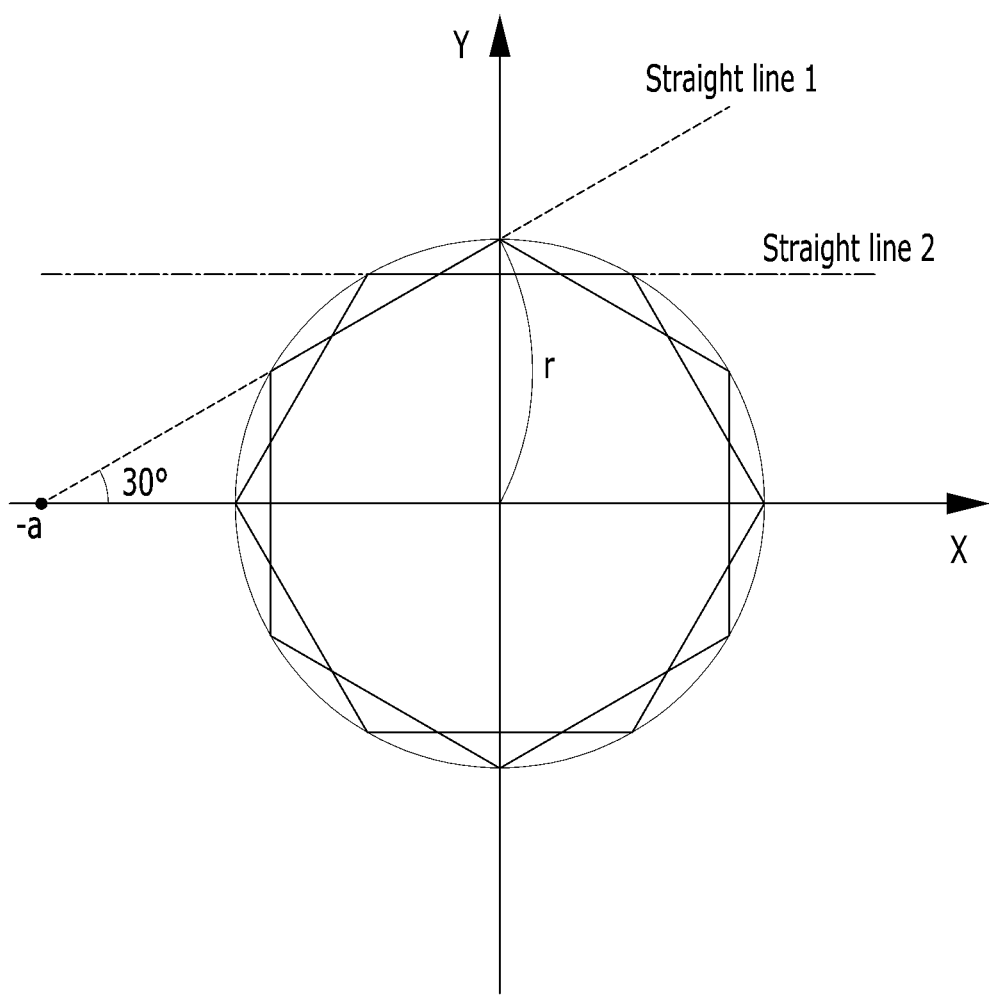

Specifically, as illustrated in FIG. 9, a linear equation of the straight line 1 is as follows.

$y = \tan 30° \cdot (x+a)$ $a = r/\tan 30°$ $\therefore y = 0.577 \cdot x + r$

Figure 10:
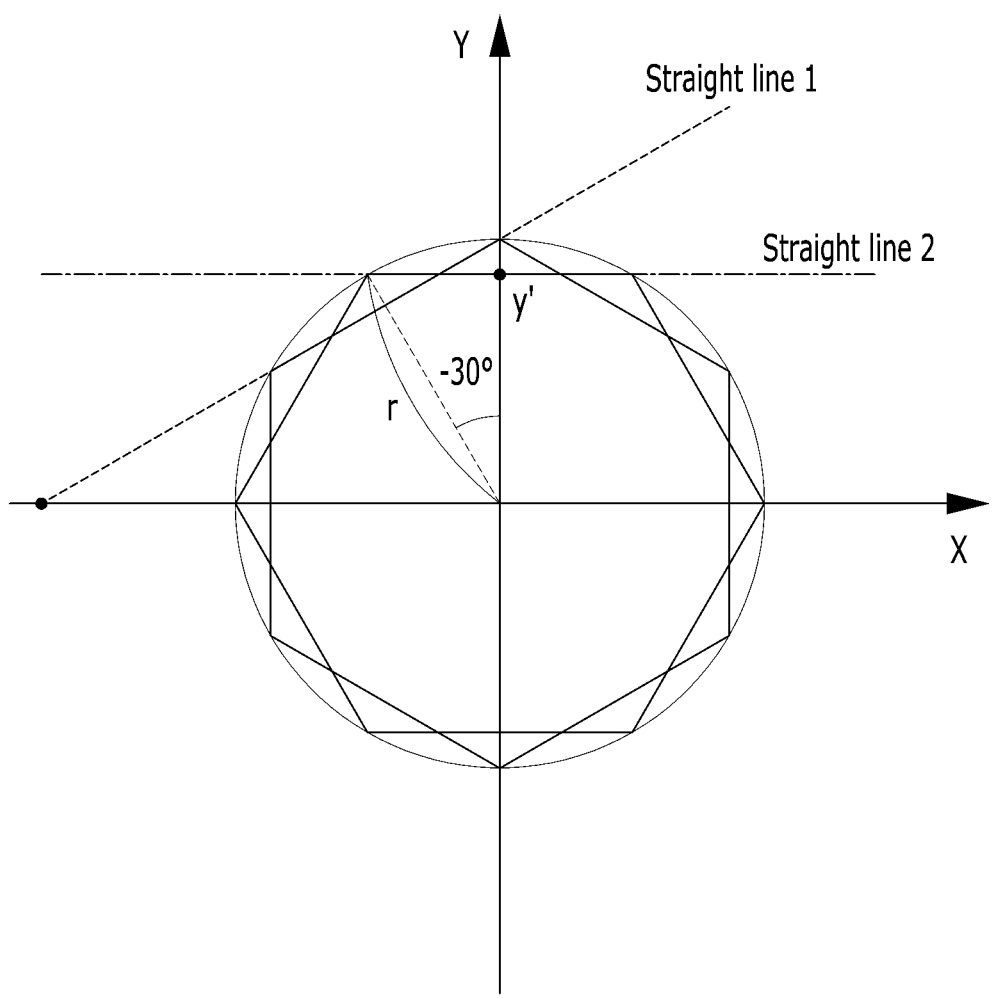

Also, as illustrated in FIG. 10, a linear equation of straight line 2 is as follows.

$$y=y'=r\cdot\cos(-30°)=0.866\cdot r$$

Figure 11:
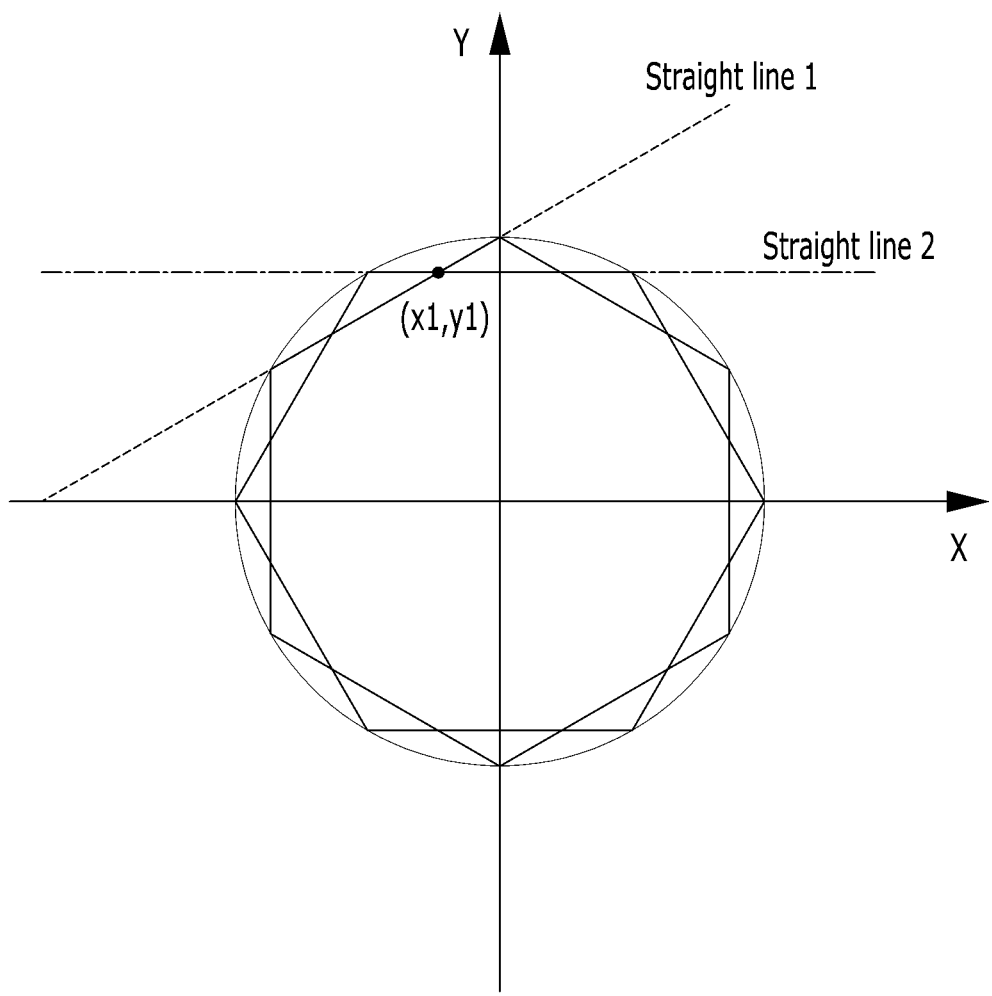

As illustrated in FIG. 11, with respect to the linear equations of the straight line 1 and the straight line 2, the coordinates of (x1, y1) where the straight line 1 and the straight line 2 meet are as follows.

Straight line 1) $y=0.577\cdot x+r$

Figure 12:
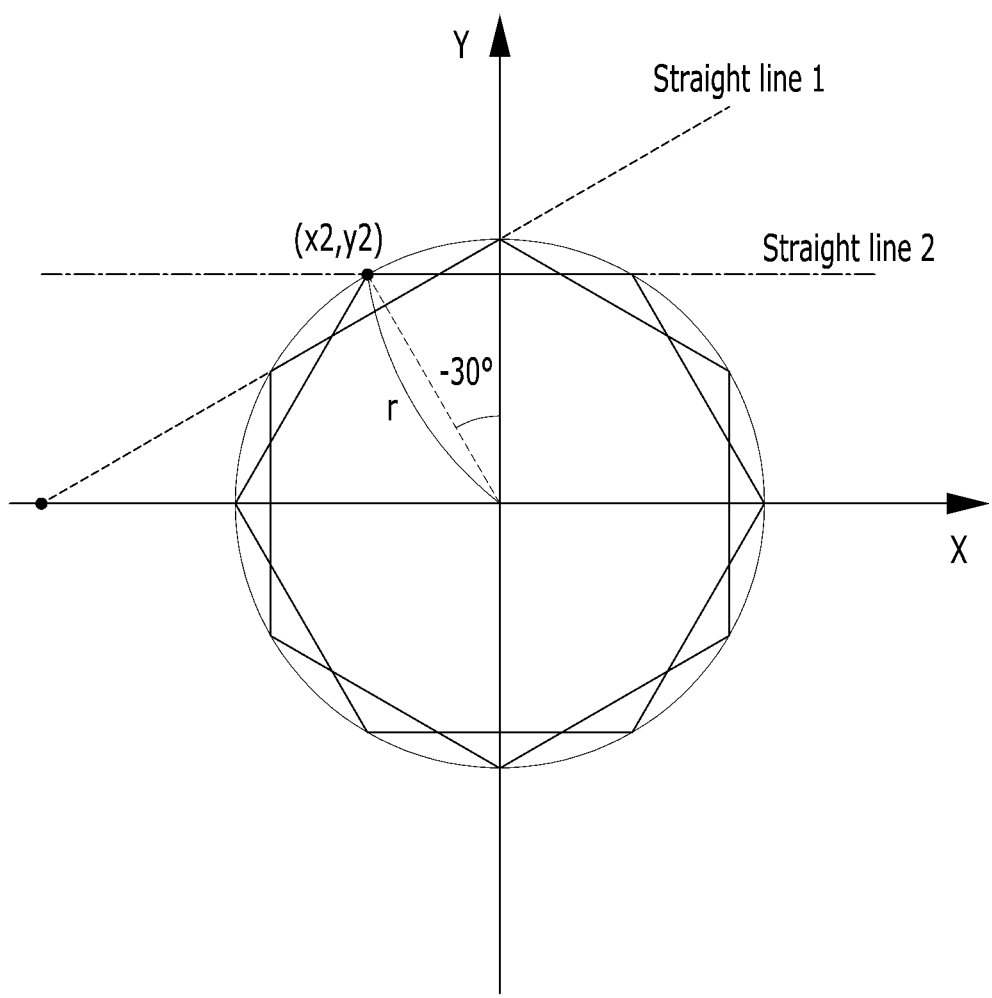

Straight line 2) $y=0.866\cdot r$ $0.577\cdot x+r=0.866\cdot r$ $x=x1=-0.232\cdot r, y=y1=0.866\cdot r$ $\therefore x1$ and $y1 \rightarrow (-0.232\cdot r, 0.866\cdot r)$ Also, as illustrated in FIG. 12, with respect to the linear equations of the straight line 1 and the straight line 2, the coordinates of (x2, y2) where the straight line 1 and the straight line 2 meet are as follows.

Figure 13:
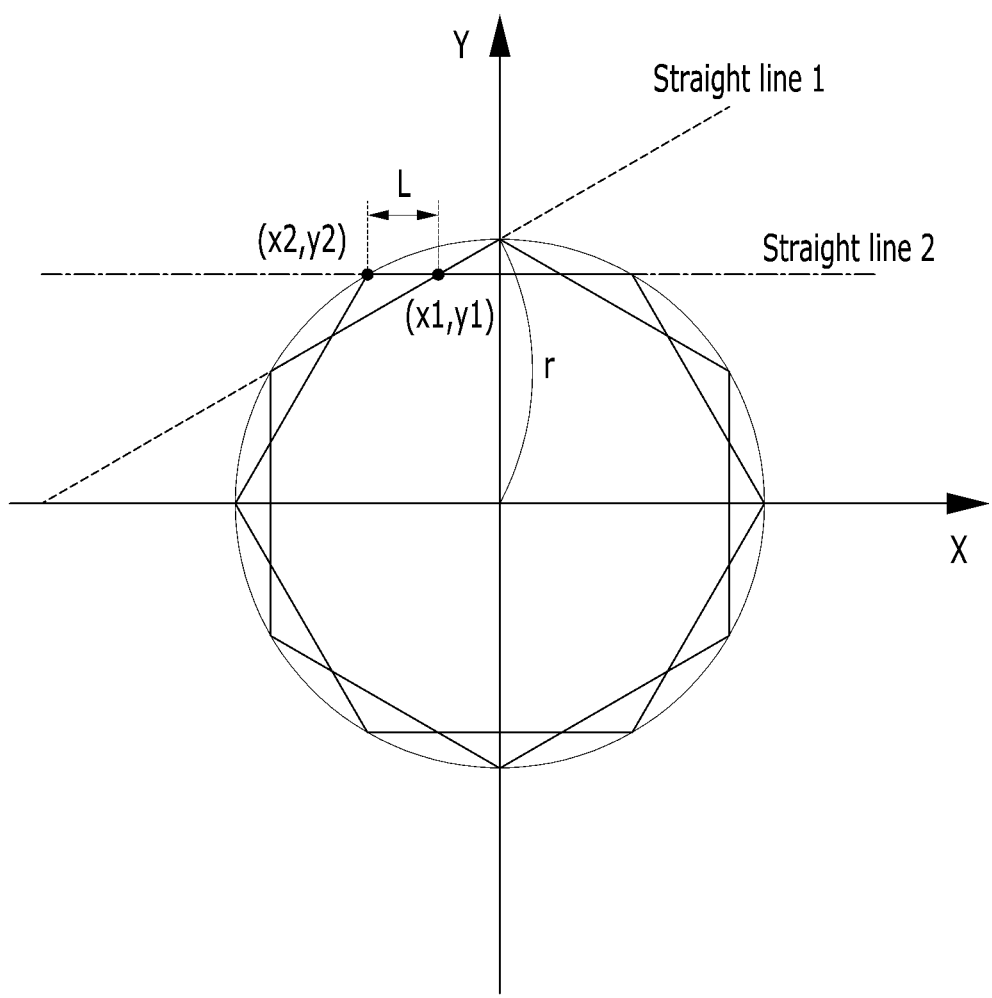

$x2=r\cdot\sin(-30°)=-0.5\cdot r$ $y2=0.866\cdot r$ $\therefore (x2,y2)\rightarrow(-0.5\cdot r, 0.866\cdot r)$ Thus, as illustrated in FIG. 13, when a distance between the (x1, y1) and (x2, y2) where the straight line 1 and the straight line 2 meet is obtained, the offset interval L may be set as follows.

Figure 14:
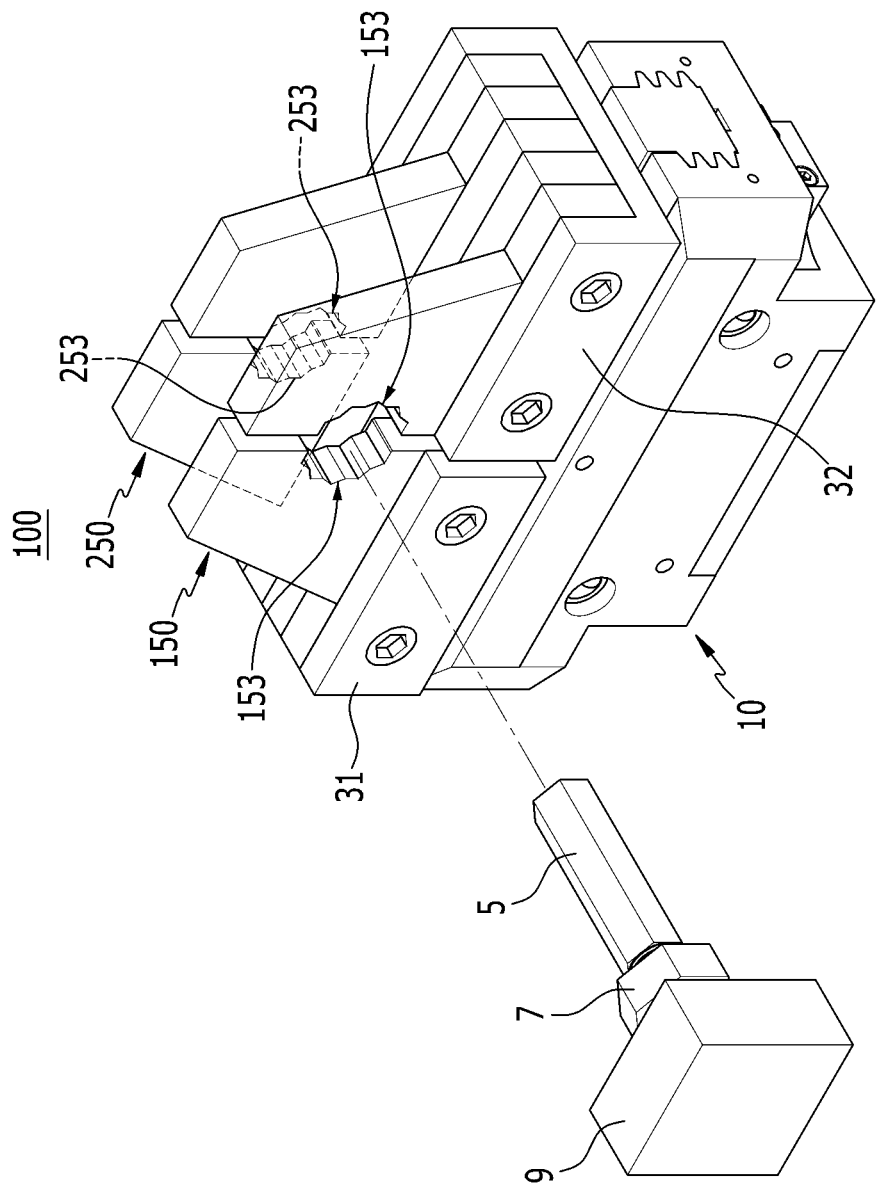
FIG. 14 is a view illustrating an application example of a robot gripper according to an exemplary form of the present disclosure.

$(x1,y1)\rightarrow(-0.232\cdot r, 0.866\cdot r)$ $(x2,y2)\rightarrow(-0.5\cdot r, 0.866\cdot r)$ $\therefore$ distance(offset interval $L$) between $(x1,y1)$ and $(x2,y2)=0.268\cdot r$ FIG. 14 illustrates an application example of a robot gripper according to an exemplary form of the present disclosure.

Referring to FIG. 14, for example, the robot gripper 100 may adjust wheel alignment of wheels of a vehicle.

For example, the bolt 5 having a relatively small size mentioned above may be fastened to a screw assembly portion 9 as a tie rod assembly, and the nut 7 having a larger size than that of the bolt 5 is fastened to a screw shaft of the bolt 5. In general, the bolt 5 is referred to as a toe adjustment bolt and the nut 7 is referred to as a stop nut.

In this manner, the robot gripper 100 for adjusting wheel alignment of wheels of a vehicle include a pair of first finger members 150 and a pair of second finger members 250 fixedly installed on the first and second mounting brackets 31 and 32.

The first finger members 150 have first gripping recesses 153 formed on facing ends thereof to correspond to a screw size of the nut 7. The second finger members 250 have second gripping recesses 253 formed on facing ends thereof to correspond to a size of the bolt 5.

Figure 15A:
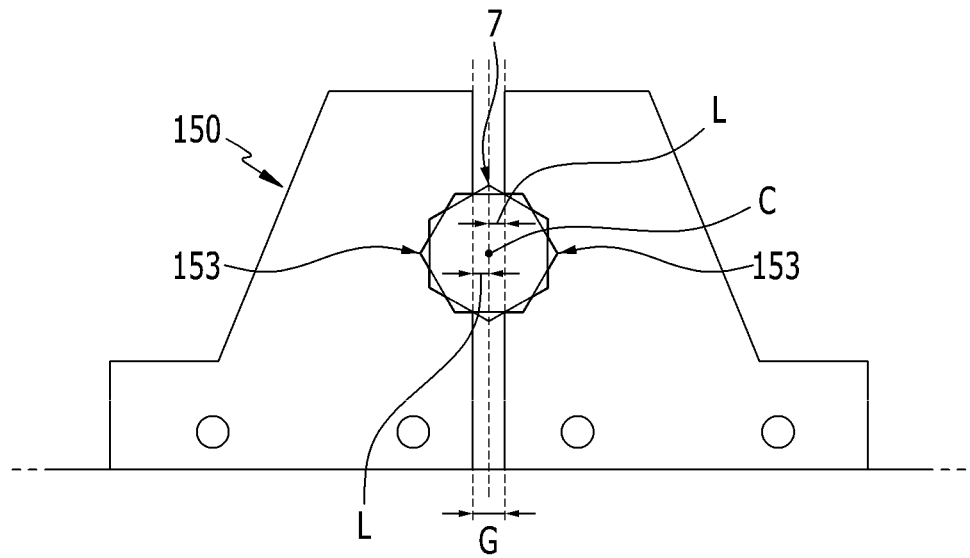
FIG. 15A is a view for explaining an operation of first finger members of a robot gripper according to the exemplary form of the present disclosure.

Here, the first gripping recess 153 is formed such that the center of the nut 7 is offset at a predetermined interval from the ends of the first finger members 150. As illustrated in FIG. 15A, when the finger members 150 grip the nut 7, an offset interval L is formed between the facing ends of the finger members 150 and the center C of the nut 7, and a predetermined gap G is formed between the facing ends due to the offset interval L.

Figure 15B:
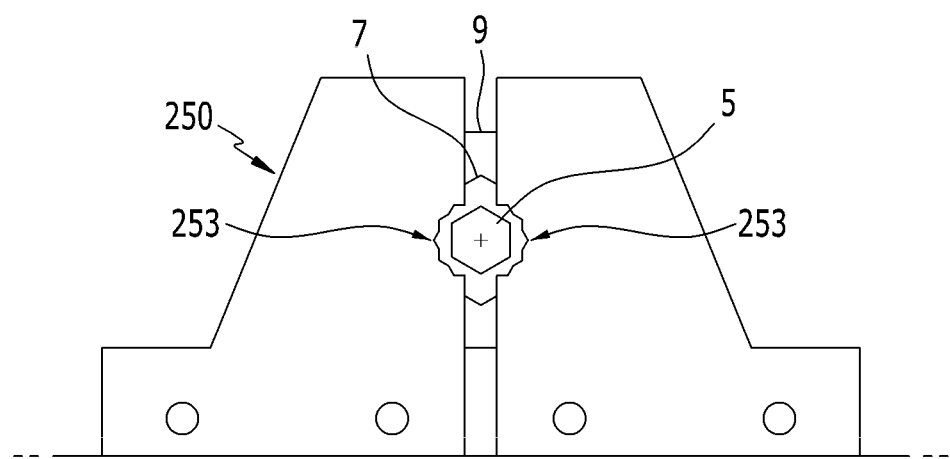
FIG. 15B is a view for explaining an operation of second finger members of a robot gripper in another form of the present disclosure.

Also, as illustrated in FIG. 15B, the second finger members 250 allow a circumscribed circle of the bolt 5 to be positioned at an inner region of the second gripping recess 253 due to the offset interval L. Further, the first and second gripping recesses 153 and 253 have the support surfaces and support recesses as described above.

Figure 16:
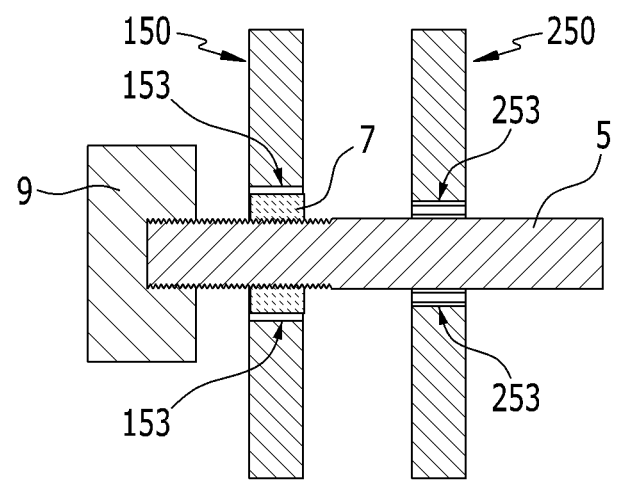
FIGS. 16 and 17 are cross-section views of a robot gripper for illustrating an operation of the robot gripper in exemplary forms of the present disclosure.

Accordingly, in an exemplary form of the present disclosure, as illustrated in FIGS. 15A and 15B, and FIG. 16, when the first and second mounting brackets 31 and 32 are moved in a direction toward each other, the nut 7 having a relatively large screw size is gripped through the first gripping recess 153 of the first finger members 150.

In this case, since the offset interval L is formed between the facing ends of the first finger members 150 and the center C of the nut 7, a circumscribed circle of the bolt 5 having a smaller size than that of the nut 7 is positioned at an inner region of the second gripping recess 253 of the second finger members 250.

Accordingly, when the gripper body 10 is rotated in one direction or in another direction according to a behavior of the robot, only the nut 7 may be tightened or loosened by the first finger members 150, while the bolt 5 is left as is.

Figure 17:
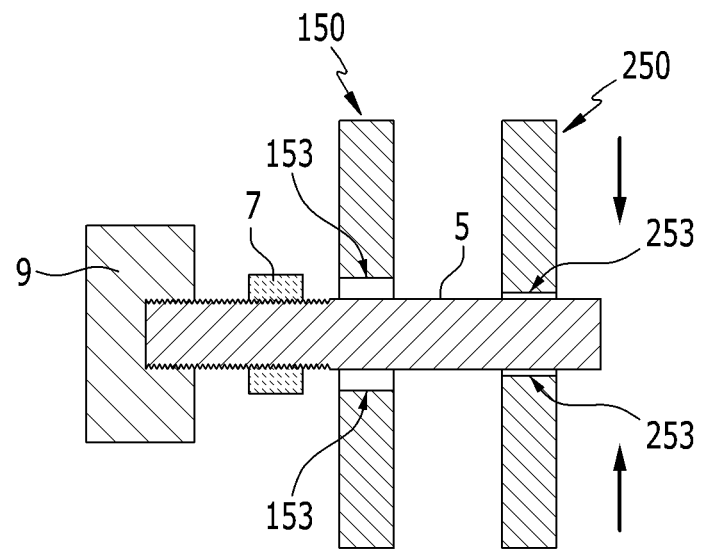

Thereafter, gripping of the nut 7 by the first finger members 150 is released by moving the first and second mounting brackets 31 and 32 in a direction away from each other. In this state, as illustrated in FIG. 17, the gripper body 10 (See FIG. 14) is moved toward the bolt 5.

Thereafter, when the first and second mounting brackets 31 and 32 are moved in a direction toward each other, the bolt 5 having a relatively small size is gripped through the second gripping recess 253 of the second finger members 250 (See, FIG. 16). Here, the nut 7 having a relatively large size is in a state of being away from the first finger members 150 (See, FIG. 17).

In this state, when the gripper body 10 is rotated in one direction or in another direction according to behavior of the robot, only the bolt 7 may be tightened or loosened by the second finger members 250, while the nut 7 is left as is.

Accordingly, the robot gripper 100 may loosen the nut 7 by the first finger members 150, rotate the bolt 5 by the second finger members 250 to adjust a toe of the wheels, and tighten the nut 7 again through the first finger members 150 to maintain the adjusted state of the toe, thereby adjusting wheel alignment of the wheels of a vehicle.

Therefore, since the running operation of loosening or tightening the bolt 5 and the nut 7 is simply performed using the single tool, time for adjusting wheel alignment of wheels of a vehicle may be shortened.

Thus far, the exemplary forms of the present disclosure have been described in detail with reference to the accompanying drawings. However, the ideas of the present disclosure are not limited thereto, and those skilled in the art who understand the ideas of the present disclosure may easily propose any other forms within the scope of the present disclosure through addition, change, deletion, and the like, and those forms will also be within the scope of the present disclosure.

DESCRIPTION OF SYMBOLS

| | |
|---|---|
| 1: screw part | 3: robot |
| 5: bolt | 7: nut |
| 9: screw assemble part | 10: gripper body |
| 31, 32: mounting bracket | 35: operating cylinder |
| 37: forward/backward operating portion | 50, 150, 250: finger member |

| | |
|---|---|
| 51: fixing bolt | 53, 153, 253: gripping recess |
| 55: support surface | 57: support recess |
| C: center | G: gap |
| L: offset interval | |

What is claimed is:

1. A robot gripper comprising:
a gripper body mounted at a front end of an arm of a robot;
a pair of mounting brackets installed on respective sides of the gripper body and configured to reciprocate in a direction toward each other or in a direction away from each other; and
at least two finger members facing each other and fixedly installed on the pair of mounting brackets,
wherein the at least two finger members each include gripping recesses configured to receive a screw part having different sizes, and
wherein the gripping recesses of the at least two finger members include:
a plurality of support surfaces supporting an edge of the screw part having a polygonal shape, and
a plurality of support recesses supporting a corner of the screw part.

2. The robot gripper of claim 1, wherein
the pair of mounting brackets are installed to reciprocate through an operating cylinder in the gripper body.

3. The robot gripper of claim 1, wherein
the gripping recesses have a size that are gradually increased or decreased from one side toward another side to correspond to the different sizes of the screw part.

4. The robot gripper of claim 3, wherein
a first finger member of the at least two finger member mounted on a first mounting bracket of the pair of mounting brackets is configured to grip one side portion of a center of the screw part through the gripping recesses of the first finger member, and
a second finger member of the at least two finger members mounted on a second mounting bracket of the pair of mounting brackets is configured to grip other side portion of the center of the screw part through the gripping recesses of the second finger member.

5. The robot gripper of claim 1, wherein
the at least two finger members are arranged in a direction perpendicular to a movement direction of each of the pair of mounting brackets, and are engaged to each of the pair of mounting brackets through a fixing bolt.

6. A robot gripper comprising:
a gripper body mounted at a front end of an arm of a robot;
a pair of mounting brackets installed on respective sides of the gripper body and configured to reciprocate in a direction toward each other or in a direction away from each other; and
at least two finger members facing each other and fixedly installed on the pair of mounting brackets,
wherein;
the at least two finger members each include gripping recesses configured to receive a screw part having different sizes,
the gripping recesses of the at least two finger members are formed such that a center of the screw part is offset by a predetermined interval from ends of the at least two finger members, the screw part includes a bolt fastened to a screw assembly portion and a nut fastened to a screw shaft of the bolt,
the bolt and the nut are provided to have different sizes, and
the at least two finger members grip the nut having a relatively large size through the gripping recesses, and the bolt having a relatively small size by positioning a circumscribed circle of the bolt in an inner region of the gripping recesses.

7. The robot gripper of claim 6, wherein
when the at least two finger members grip the screw part, an offset interval is formed between facing ends of the at least two finger members and the center of the screw part.

8. The robot gripper of claim 7, wherein
when the at least two finger members grip the screw part, a predetermined gap is formed between the facing ends of the at least two finger members due to the offset interval.

9. The robot gripper of claim 8, wherein
when the gripping recesses receive the nut having the relatively large size, the offset interval is configured to position the gripping recesses outside of the circumscribed circle of the bolt having the relatively small size.

10. A robot gripper for tightening or loosening a screw part including a bolt fastened to a screw assembly portion and a nut fastened to a screw shaft of the bolt, the robot gripper comprising:
a gripper body mounted at a front end of an arm of a robot;
a first mounting bracket and a second mounting bracket installed on respective sides of the gripper body and configured to reciprocate in a direction toward each other or in a direction away from each other;
a pair of first finger members facing each other and fixedly installed on the first and second mounting brackets, respectively, the pair of first finger members including first gripping recesses configured to receive the nut; and
a pair of second finger members facing each other and fixedly installed on the first and second mounting brackets, respectively, the pair of second finger members including second gripping recesses configured to receive the bolt having a smaller size than the nut,
wherein the first gripping recesses are formed such that a center of the nut is offset at a predetermined interval from ends of the first finger members.

11. The robot gripper of claim 10, wherein
when the pair of first finger members grip the nut, an offset interval is formed between facing ends of the pair of first finger members and the center of the nut, and a predetermined gap is formed between the facing ends due to the offset interval.

12. The robot gripper of claim 11, wherein
the pair of second finger members allow a circumscribed circle of the bolt to be positioned at an inner region of the second gripping recesses.

13. The robot gripper of claim 10, wherein
the first and second gripping recesses have a plurality of support surfaces respectively supporting edges of the screw part having a polygonal shape and a plurality of supporting recesses supporting corners of the screw part.

14. The robot gripper of claim 10, wherein
the robot gripper adjusts wheel alignment of wheels of a vehicle by tightening or loosening a bolt fastened to a tie rod assembly and a nut having a greater size than the bolt, and the nut is fastened to a screw shaft of the bolt through the first and second finger members.

* * * * *